United States Patent [19]
Mingotti

[11] 3,807,924
[45] Apr. 30, 1974

[54] VOLUMETRIC INJECTOR PARTICULARLY FOR DELIVERING BATCHES OF FLUID PLASTICS MATERIAL

[76] Inventor: Aurelio Mingotti, Via Leopardi, 60, Imola, Italy

[22] Filed: Jan. 17, 1972

[21] Appl. No.: 218,317

[30] Foreign Application Priority Data
Apr. 10, 1971  Italy.................................. 3391/71

[52] U.S. Cl.............................. 425/245, 425/809
[51] Int. Cl.............................................. B29f 3/00
[58] Field of Search ........... 425/242, 243, 244, 245, 425/135, 809

[56] References Cited
UNITED STATES PATENTS
3,158,905   12/1964   Havlik............................... 425/136
3,247,304   4/1966   Ninneman........................ 425/245 X
3,674,393   7/1972   Busi.................................... 425/110

*Primary Examiner*—R. Spencer Annear
*Attorney, Agent, or Firm*—Dr. Guido Modiano; Dr. Albert Josif

[57] ABSTRACT

An improved volumetric injector for delivering batches of fluid plastics material comprising a body in which a seat and a chamber are formed communicating with one another, a cap arrangement for receiving a batch of material from the body and capable of operatively abutting against thereto and a valve assembly in the seat which is arranged to controllably supply plastics material to the cap arrangement when the latter is caused to abut against the body.

4 Claims, 1 Drawing Figure

PATENTED APR 30 1974 3,807,924
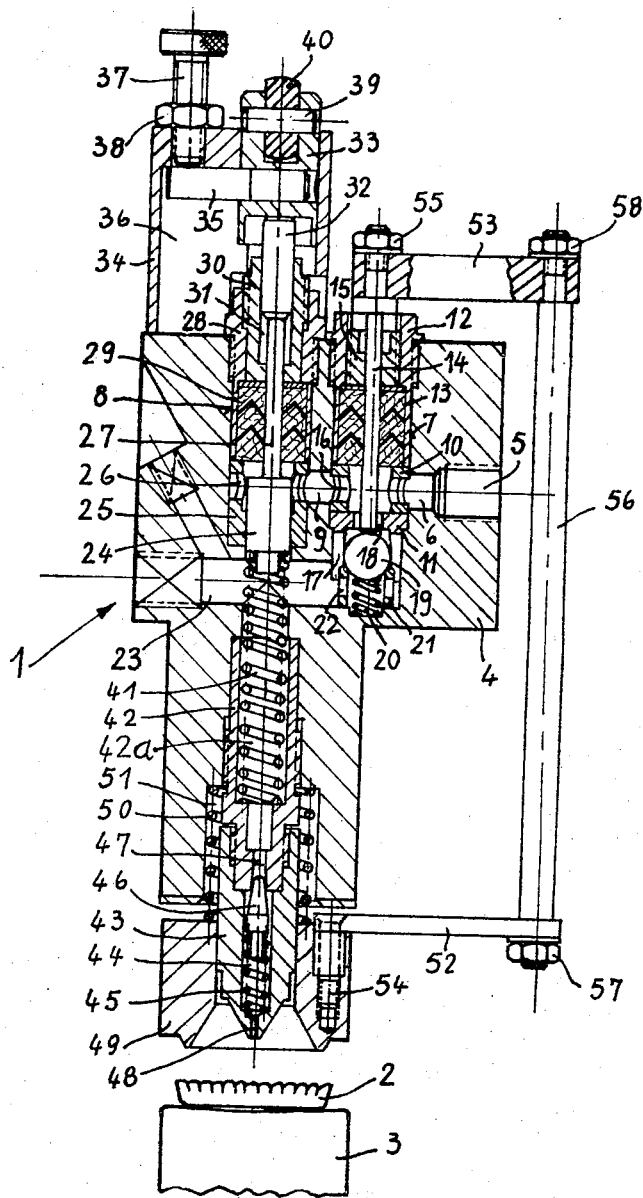

VOLUMETRIC INJECTOR PARTICULARLY FOR DELIVERING BATCHES OF FLUID PLASTICS MATERIAL

The present invention relates to an improved volumetric injector particularly adapted for delivering batches of fluid plastics material.

Injectors which supply volumetric batches of plastics material in the fluid state are already available. These injectors are used for example in plant for the manufacture of crown caps for depositing within them a batch of fluid plastics material which after squeezing or centrifuging until it covers the base of the caps forms a gasket for sealing the containers on which the caps are applied.

Known injectors however give rise to some considerable disadvantages. One of the most important consists of the fact that the material to be injected possesses abrasive characteristics because of the presence of fillers, which lead to rapid gasket wear so creating seal problems for the working members which are usually taken to the outside for their operation. These abrasive properties are made more harmful in that the seal gaskets in known injectors are subjected to the high injection pressure and not to the much lower feed pressure of the plastics material.

A further disadvantage of conventional injectors is the absence or complexity of the sensing members which detect the presence or absence of the component on which the batch is to be deposited and which allow or prevent the injection of plastics material. In effect, if the sensing members are absent, they always supply a batch and if the component which is to receive said batch is absent this causes troublesome fouling and represents a loss of product. On the other hand the application of complex sensing members is a source of frequent jamming which can cause serious stoppages of the whole plant.

An object of the present invention is consequently to provide an improved injector capable of obviating the aforementioned disadvantages, with a simple structure with consequent case of construction and low manufacturing costs.

According to the invention there is provided an improved volumetric injector, particularly for delivering batches of fluid plastics material comprising a body in which a seat and a chamber are formed communicating with one another, a cap means for receiving a batch of material from said body and arranged to operatively abut against the said body adjacently the said seat and a valve means in said seats to controllably supply said plastics material to said cap means upon abutment engagement of the latter with said body.

BRIEF DESCRIPTION OF THE DRAWING

The invention will be more evident from the detailed description given thereinafter of a preferred but not exclusive emgodiment illustrated by way of example in the accompanying drawing in which :

the single FIGURE shows a sectional elevation through an axial plane of an injector according to the invention.

DESCRIPTION OF THE PREFERRED EMBODIMENTS

With reference to said FIGURE, the injector is shown overall by the reference numeral 1. Said injector 1 is mounted for example on a rotating head in a manner which is not shown, and is able to deposit a small quantity of plastics material in the fluid state into the interior of a crown cap 2, which is raised vertically by a mobile support 3, when aligned with the injector 1. Obviously approach can be obtained between the injector and the cap by lowering the injector instead of raising the cap.

The injector 1 comprises a body 4 in which cavities are formed for housing the working and control members, and channels for conducting the plastics material to be injected. An inlet mouth 5 is connected to a feed duct for the plastics material which continues as a channel 5' emerging in a cylindrical chamber 7. Disposed parallel to said chamber 7 there is a cylindrical seat 8 which communicates with the chamber 7 by means of a passage 9. In the chamber 7 are housed a bush 10 and a casing 11 provided at its upper base with a projecting edge which engages in a shoulder formed by the internal wall of the chamber 7. The bush 10 and casing 11 are locked against said shoulder by a sleeve 12 screwed into the chamber 7 and containing a pack 13 of gaskets, traversed axially by a shaft 14. In order to seal the external surface of the shaft 14 against the internal surface of the sleeve 12, the pack of gaskets 13 is squeezed, with the interposing of a thrust bearing, against the upper face of the bush 10 by a nut 15 screwed into the sleeve 12. The bush 10 and casing 11 comprise peripheral apertures 16 and 17, respectively, of which the apertures 16 are connected together by an external annular groove, and in the base of the casing 11 there is a hole 18 into which the end of the shaft 14 penetrates. As shown in the FIGURE, inside the casing 11 there is a sphere 19 thrust against the end of the shaft 14 by a spring 20.

Said spring 20 is disposed within a ring 21 embedded in the lower edge of the casing 11 and provided with peripheral apertures 22.

The sphere 19 acts as a unidirectional valve and consequently when it is in the position shown in the FIGURE, the channel 6 is connected by way of the apertures 16, the hole 18 and the apertures 17 to a channel 23 whose axis is perpendicular to that of the cylindrical seat 8 and lying in the same plane as this latter.

A description is hereinafter given of the working parts of the injector 1, i.e. of those parts which cause expulsion of the plastics material. Said parts comprise a piston 24 guided in a bush 25 inserted in the cylindrical seat 8 and provided with peripheral apertures 26 connected together by an external annular groove and communicating by way of the ducts 9 with the feed channel 5. The piston 24 has a rod 27 which is led to the outside by way of a stuffing box of the previously described type comprising a sleeve 28 screwed into the seat 8 and a pack of gaskets 29, on which a suitable shaped nut 30 screwed into the sleeve 28 acts by way of a thrust bearing. In the nut 30 there is a well 31 which serves as a guide for a pin 32 on which a cylindrical member 33 rests, slidably guided in a member 34 mounted at the summit of the body 4. In the cylindrical member 33 there is a peg 35 which projects radially so as to engage in a vertical slot 36 in the member 34. The peg 35 serves for adjusting the return stroke of the piston 24, whose upper stop level is determined by the adjustable stop represented by the adjusting screw 37 and its relative locking nut 38, against which the stem 35 strikes. If the injector 7 is mounted on a circular machine or reel, advantageously the piston 24 is driven by way of a fixed cam which operates axially on the member 33. In this case a roller 40 is rotably supported by a gudgeon pin at the summit of said member 33, and rolls on the profile of the fixed cam. The stroke of the piston 25 takes place in opposition to the action of return means comprising a cylindrical helical spring 41 housed in a tubular member 42 screwed into a corresponding seat in the tubular body 1 coaxial to the cylindrical seat 8 and forming the injection duct 42a. At the lower end of said member 42 which forms the injection duct connected to the duct 23, a nozzle 43 is screwed into an axial recess or duct 44 in which there is a spring 45 which presses on a plugging member or pin 46. Under the thrust of the spring 45 the pin 46 closes a hole 47 in the base of the member 42, so preventing the plastics material from passing into the recess 44 and flowing out through the orifice 48 of the nozzle 43 when the injector is not in operation. It should be observed that the maximum diameter of the pin 46 is less than the diameter of the recess 44, because of which between the external face of the pin 46 and the wall of the recess 44 there is an interstice which allows passage of the plastics material when the signal is given for the expulsion of a batch on to the crown cap 2. The members provided for controlling the expulsion of the plastic material from the injector comprise a senser which is constituted by a bush 49 guided coaxial to the nozzle 43 and maintained separated from the lower end of the body 4 by means of a spring 50 housed in a cavity 51 in this latter. Said bush 49 is connected to the shaft 14 by means of a lever mechanism comprising two arms 52 and 53 fixed at one end to the bush 49 and shaft 14, respectively, by a screw 54 and nut 55, respectively, and joined together at their other ends by a rod 56 fixed by nuts 57 and 58.

Operation of the injector heretofore described is as follows: when in a state of rest the injector is in the position shown in the FIGURE, in which plastics material in the molten state and at low pressure (for example 0.2 atm.) fills the channel 6, the internal space in the bush 10, the channel 23 and the tubular member 42. The material is prevented from escaping through the nozzle 43 because the pin 46 is thrust by the spring 45 against the hole 47 with a force greater than that deriving from the pressure with which the material is introduced into the injector.

In order to deposit a batch of product into the cap 2, the cap is raised by the mobile support 3 until it encounters the bush 49, which moves with respect to the body 4, and by way of the lever mechanism 52, 56, 53 causes the shaft 14 to be raised. In this manner the sphere 19 can close the hole 18 under the thrust of the spring 20.

The piston 24 is successively driven downwards by the cam which acts axially on the roller 40. When the pressure in the space defined by the channel 23 and the tubular member 42 is such as to cause the pin 46 to leave the hole 47, the material is expelled through the orifice 48. The batch of material expelled is substantially equal to the volume defined by the product of the cross sectional area of the piston 24 and its stroke. If the cap 2 is absent, the bush 49 conserves its distance from the body 4 so that the shaft 14, remaining immobile and keeping the sphere 19 lowered, keeps the channel 6 in communication with the duct 23. Consequently any successive operation of the piston 24 only pushes a corresponding quantity of material backwards towards the duct 6, through the apertures 17 and the hole 18, because insufficient pressure is formed for overcoming the force of the spring 45 in order to free the hole 47 of the pin 46.

The invention thus conceived substantially attains the aforementioned objects. In particular the packs of the gaskets 13 and 29, being subjected to a pressure equal to the fluid material supply pressure, are not subjected to any sensible wear. Moreover the presence of the senser, allowing injection only in the presence of the cap, avoids material losses and fouling.

In the practical embodiment of the invention, the materials used and the shapes and dimensions may be modified without leaving the scope of the inventive idea.

I claim:

1. An improved volumetric injector, particularly for delivering batches of fluid plastics material in cap means comprising a body operatively cooperating with the cap means which receives the batch of material in such a manner that the distance between them can be reduced by moving one relative to the other, a seat and a chamber form ed in said body and communicating with one another, a piston guided in said seat and driven against return means, a shaft guided in said chamber, said shaft and the piston rod extending outward from the body by way of a seal member for subjection to driving means, means for adjusting the piston stroke, an injection duct formed in said body below the piston and communicating at one end with atmosphere by way of an orifice, and at the other end with said chamber by way of a valve controlled by the shaft, a plugging member disposed in said duct and adapted to intercept its passage under the thrust of resilient means acting in a direction opposed to the direction of injection, and a senser which detects the presence of the cap means which receives the batch of material and is guided in said body close to the orifice against the action of resilient means, said senser being connected mechanically to that extremity of the shaft which extends outward from said body in such a manner as to drive the valve into the shut position when the senser detects the presence of the cap means which is to receive the batch, or into the open position when said cap means is absent.

2. An injector as claimed in claim 1, in which said injection duct is formed by a tubular member screwed into said body in alignment with the piston and housing a return spring for this latter.

3. An injector as claimed in claim 2, in which at the lower end of said tubular member a nozzle is arranged on which a bush constituting the senser is guided and moves in opposition to a helical spring housed in a cavity in the body of the injector coaxial with said tubular member, said bush being connected to the driving shaft of the valve by way of a lever mechanism.

4. An injector as claimed in claim 1, in which said valve is of the unidirectional type and comprises a bush provided with peripheral apertures and a hole in its base in alignment with said shaft in such a manner that this latter penetrates said hole in order to act on a sphere housed together with a spring in said bush, said sphere closing said hole when the shaft is not acting on it.

\* \* \* \* \*